Patented Jan. 22, 1952

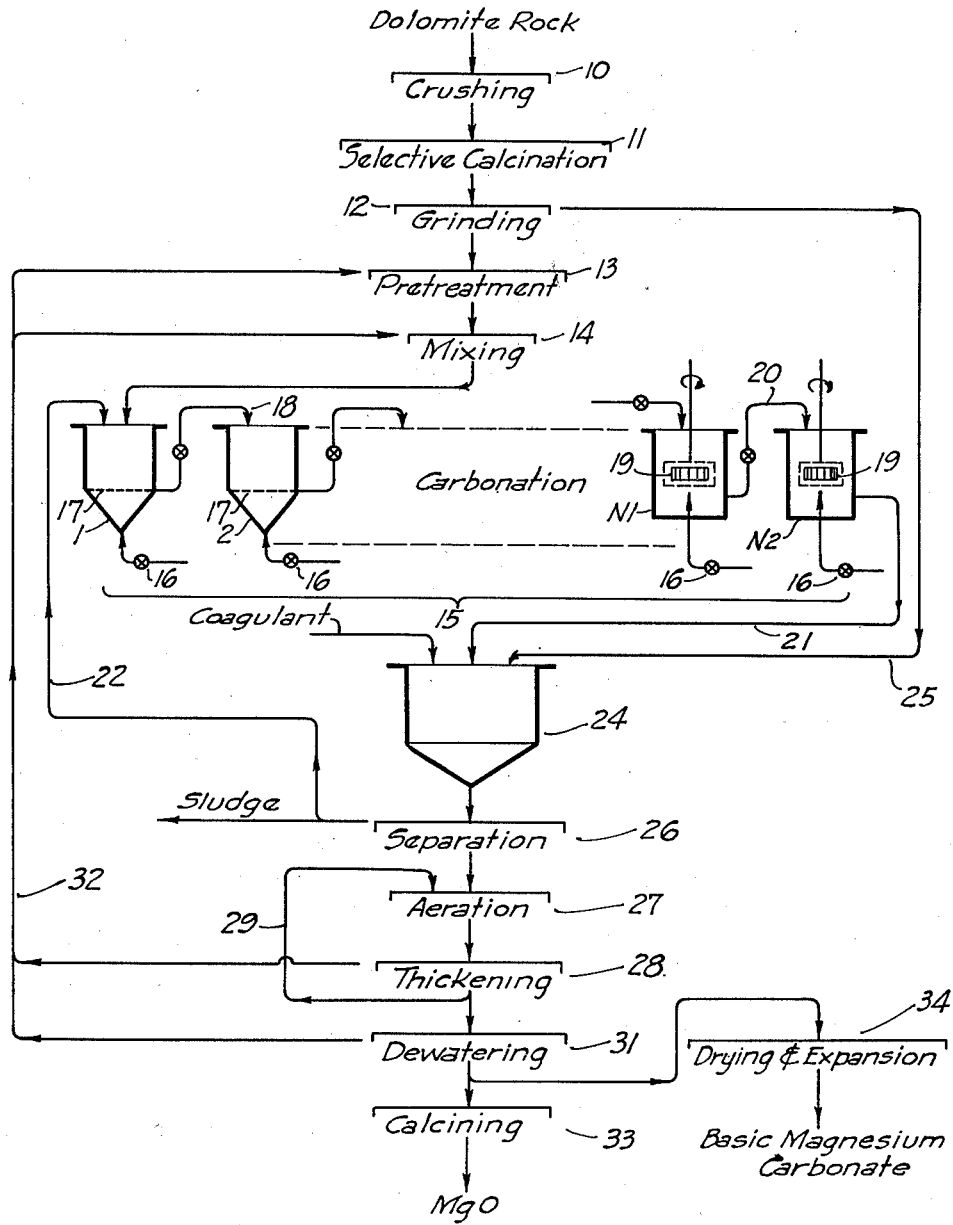
FIG_1_

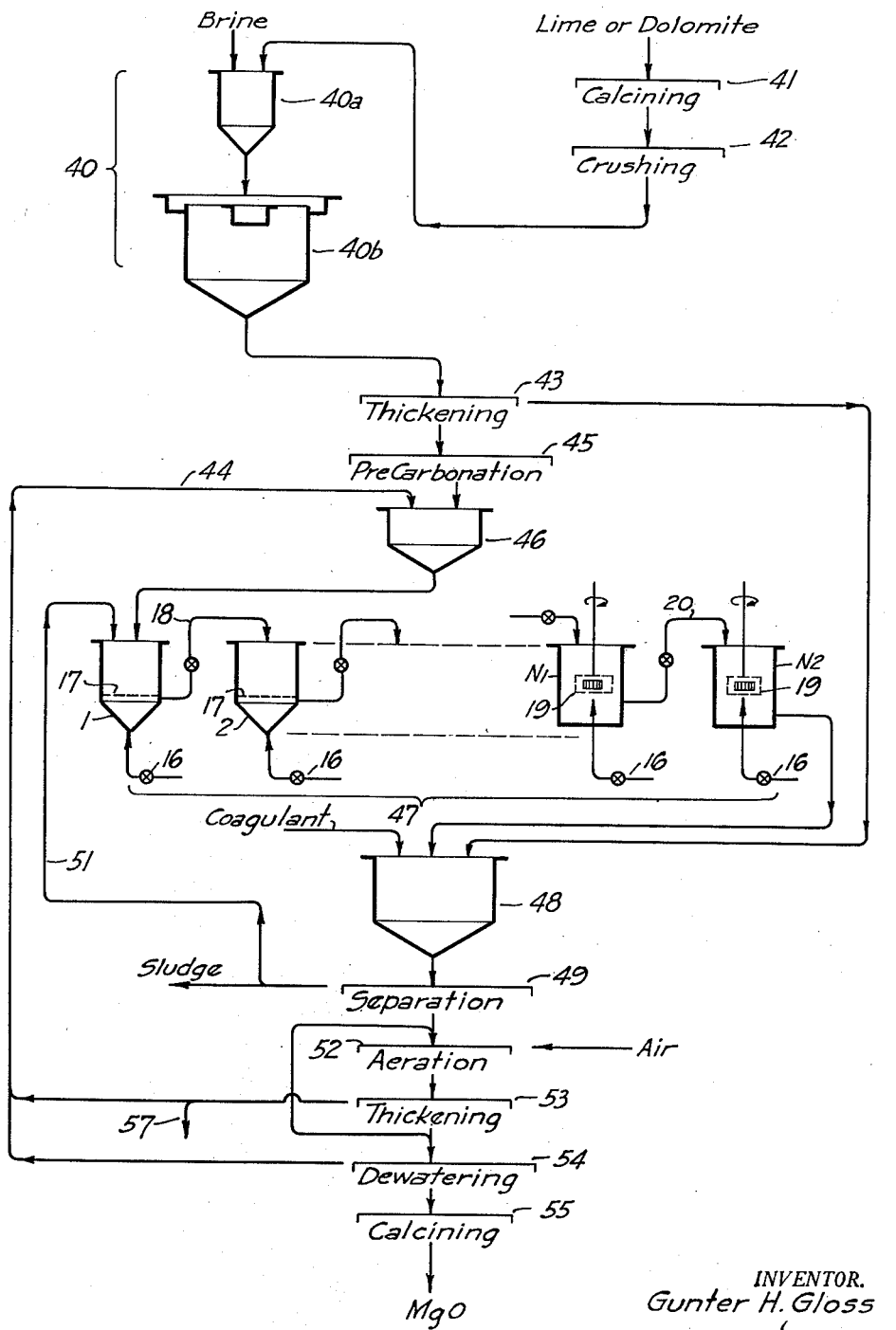
FIG_2

2,583,331

UNITED STATES PATENT OFFICE 2,583,331

PROCESS FOR THE MANUFACTURE OF MAGNESIUM CARBONATE

Gunter H. Gloss, Redwood City, Calif., assignor to Merck & Co., Inc., Rahway, N. J., a corporation of New Jersey Application August 19, 1946, Serial No. 691,585

4 Claims. (Cl. 23—67)

This invention relates generally to processes for manufacture of relatively pure magnesium compounds like magnesium carbonate or magnesium oxide, from various available sources of material.

Patent No. 2,390,095, granted December 4, 1945, entitled "Process for the Manufacture of Magnesium Products," discloses a process making possible manufacture of relatively pure magnesium compounds from sources of raw material such as dolomite, brucite, magnesite, serpentine, olivine, slurries containing magnesium hydroxide, or the like. The process involves the conversion of the magnesium content of the raw material to magnesium bicarbonate in solution, the removal of the solution from solid phase impurities, and the subsequent aeration of the solution to precipitate solid phase neutral magnesium carbonate. The neutral magnesium carbonate may then be further processed to produce other compounds such as basic magnesium carbonate, magnesium oxide, etc.

An object of the present invention is to generally improve upon the process of said Patent 2,390,095. Improved features of the present process include a more effective carbonation operation to enable higher concentrations of magnesium bicarbonate solution, which in turn enables an increase in productive capacity of a given plant installation and a higher effective yield from the raw material. Another feature involves minimizing scale formation within the equipment used for the carbonating operation. A further feature involves precipitation of dissolved calcium bicarbonate in the magnesium bicarbonate solution prior to separating sludge solids from the same, with this operation being carried out in such a manner as to offset an increase in calcium bicarbonate caused by the manner in which the carbonating operation is conducted to increase the concentration of magnesium bicarbonate solution.

Additional objects and features of the invention will appear from the following description in which the preferred embodiments have been set forth in detail in conjunction with the accompanying drawing.

Referring to the drawing:

Figure 1 is a flow sheet illustrating one embodiment of the present invention.

Figure 2 is a second flow sheet illustrating another embodiment of the invention.

The flow sheet of Figure 1 shows a process applied to the treatment of dolomite rock, which is a natural mineral particularly applicable to the process. The dolomite rock after being quarried is subjected to crushing 10, where it is reduced to comparatively small fragments, as for example fragments measuring about ⅜ of an inch in diameter. Following crushing the material is subjected to calcining 11, which is preferably carried out selectively so that a majority of the calcium carbonate is unconverted. Selective calcining can be carried out by suitable equipment such as a Nichols Herreshoff furnace, the temperatures used depending upon the material being treated. For example in the calcining of a dolomitic marble from Sonora, California, the temperatures can range from 760 to 800° C. With careful selective calcining the calcined material consists mainly of calcium carbonate, magnesium oxide, solid impurities, and a small percentage of converted calcium oxide.

Following calcining the material is subjected to grinding 12 which can be carried out by conventional apparatus, as for example a closed circuit ball mill. Sufficient water is added at this point to carry out wet grinding, and consequently a considerable part of the magnesium oxide is converted to magnesium hydroxide. Good results can be secured by carrying out grinding until the particle fineness is of the order of 200 mesh.

The ground material is then subjected to a pretreatment 13, which serves to convert substantially all of the calcium oxide or calcium hydroxide present to solid phase calcium carbonate of such particle size that it can be readily removed in a later operation. This can be conveniently carried out by contacting the slurry for a short time with carbon dioxide containing gas, such as flue gas. Another suitable procedure is to introduce small amounts of magnesium bicarbonate solution at a relatively slow rate from the aerating operation to be presently described. Instead of carrying out pretreatment as a separate step it is evident that the slurry can be contacted with carbon dioxide gas or small amounts of bicarbonate solution to accomplish the same purpose, during the wet grinding operation 12.

Following pretreatment at 13 the slurry passes to the mixing operation 14 where it is diluted with water to form a relatively dilute slurry for subsequent carbonation. For example in a typical instance in which a 2.5% bicarbonate solution is to be formed by carbonation, the material before dilution can contain 50% solids, and after dilution about 3.1% solids, assuming that a dolomite containing the equivalent of 20% MgO is used. Diluted slurry then passes to the carbonating operation 15, which serves to convert the magnesium compounds present, including magnesium hydroxide and/or magnesium oxide, to magnesium bicarbonate in solution. While the equipment for carrying out this carbonating operation may vary in practice, it is desirable to utilize a large number of treatment tanks arranged for serial flow of the solution being treated. The first two tanks 1 and 2 and the last two tanks N1, N2 have been indicated diagrammatically. All of the tanks are shown being supplied with suitable carbon dioxide containing gas by way of lines 16. Tanks 1 and 2 are shown being supplied with perforated baffles 17 for distributing the upwardly moving carbon dioxide containing gas. Line 18 represents the removal of material from one tank for discharge into the next succeeding tank. Generally it is convenient to provide serial flow by gravity. The last tanks N1, N2 are shown provided with suitable mechanical agitators 19, such as agitators of the type known as turbo agitators. Line 20 represents flow of material from tank N1 to tank N2. Line 21 represents removal of the finally treated material from the last tank N2. It will be evident that in this carbonation method the material being treated flows serially through many tanks to be finally received in the last tanks N1, N2, where it is further contacted with carbon dioxide while being subjected to mechanical agitation. The advantages to be gained by agitation will be presently explained in detail. If desired the concentration of carbon dioxide in the flue gas used and introduced by way of lines 16, may be adjusted or varied for different stages of the treatment, as for example a higher concentration may be used for the latter stages. However, in general it is satisfactory to use a flue gas of reasonable concentration, as for example one containing from 20 to 30% carbon dioxide.

It is desirable that the head of the carbonating system also receive certain sludge solids introduced by way of line 22. The purpose of this feature will be later explained in detail.

The material removed from the carbonating operation and received in the treatment tank 24 consists of magnesium bicarbonate solution, together with certain dissolved impurities, and also solid impurities including calcium carbonate and other solid phase material derived from the dolomite. In a typical instance the magnesium bicarbonate solution will have a concentration of from 1.5 to 3.0%. The dissolved impurities include a certain amount of calcium bicarbonate which is apparently formed during the carbonating operation. The amount of this calcium bicarbonate, while small in overall percentage, appears to be greatly increased because of the use of agitation during the last stage or stages of the carbonating operation. This dissolved calcium content is detrimental where a final product of high purity and low calcium content is desired, because in subsequent aeration it is precipitated and occludes upon the particles of neutral magnesium carbonate. I precipitate such dissolved calcium at this point by provision of a hydroxyl ion which combines with the calcium bicarbonate to form solid phase calcium carbonate. Various materials can be introduced into the bicarbonate solution to provide hydroxyl ion. For example small amounts of caustic such as sodium hydroxide can be used. It is also possible to add at this point small amounts of magnesium hydroxide or oxide, or calcium hydroxide or calcium oxide. In place of adding extraneous material to the process for this purpose it is desirable to utilize a small amount of the dolomite slurry as indicated by line 25. Sufficient time period should be provided for reaction between the added dolomite and the bicarbonate solution, to insure precipitation of dissolved calmium bicarbonate and calcium carbonate. Precipitation of the calcium bicarbonate, and also the subsequent hydraulic separation of sludge solids from the solution, is aided by the introduction at this point of a suitable coagulant or flocculating agent, such as for example alum or ferric ion with or without an acid treated sodium silicate.

Following treatment at 24 the material passes to the separating operation 26 which can be carried out by the use of suitable hydraulic separating equipment capable of removing the solid phase material, as for example the separating methods disclosed in said Patent 2,390,095. The solid phase material is removed from this operation as a sludge, while the desired magnesium bicarbonate solution is removed in an overflow, free of the solid phase impurities.

The magnesium bicarbonate solution is then subjected to aeration 27 which can be carried out by the use of the equipment and by the method disclosed in said Patent 2,390,095. Briefly aeration is carried out by passing air through the material undergoing treatment whereby carbon dioxide is removed from the solution and a substantial part of the magnesium bicarbonate converted to solid phase neutral magnesium carbonate. After such aeration treatment the material is shown subjected to a thickening operation 28, with a certain amount of the thickened material being returned back to the aeration operation 27 by line 29, as described in said Patent 2,390,095. This serves to increase the size of the neutral magnesium carbonate particles, thus providing a solid phase material having a relatively high settling rate. In addition this feature effects a saving in the quantity of air employed because of the more rapid deposition of neutral carbonate on the large external surfaces provided by the recycled solids, and because of the short aeration time made possible. In addition such return minimizes scale formation in the apparatus employed.

Thickened material from 28 passes to the dewatering operation 31, which can be carried out by suitable apparatus such as centrifuges, filters or the like. Effluent from the operations 28 and 31 is shown being returned by line 32 to the pretreatment and mixing operations 13 and 14. Neutral magnesium carbonate from 31 can be calcined at 33 to provide a relatively pure magnesium oxide as indicated. Also such material may be subjected to drying and expansion at 34 to produce a basic magnesium carbonate as illustrated.

In carrying out the process described above the carbonation treatment is conducted without applying pressure to the surface of the liquid in the various treatment tanks, although if desired some pressure can be applied to the later stages in order to increase the magnesium bicarbonate concentration. When carbonation is carried out at atmospheric pressure without provision for mechanical agitation such as is provided by the turbo agitators 19, there is a tendency for some large crystals of magnesium carbonate to remain undissolved, it is difficult to raise the concentration of the magnesium bicarbonate solution above about 1.5%, and it is difficult to maintain a higher concentration while at the same time converting a high percentage of the magnesium hydroxide or oxide to magnesium bicarbonate. Mechanical agitation serves to accelerate the dissolution of any solid phase magnesium carbonate which has remained in suspension and in general it facilitates attainment of higher concentrations and a relatively high percentage conversion to magnesium bicarbonate. The net result is that for given conditions of operation, including a given $CO_2$ concentration for the flue gas employed, it is possible to attain considerably higher concentrations of magnesium bicarbonate solution. For example where without agitation a magnesium bicarbonate concentrate of 1.5 is obtained, with agitation as described in the last stage or stages, concentration can be readily increased to about 1.7% without application of pressure to the material undergoing treatment. In addition a relatively high percentage of conversion of the magnesium hydroxide or oxide to magnesium bicarbonate, can be maintained. While an increase in magnesium bicarbonate concentrate at this point in the process is highly desirable and makes for greater efficiency in capacity, it has been found to be disadvantageous in that it simultaneously serves to increase the percentage of calcium bicarbonate formed. In the present process this is offset by the operation 24 which precipitates the calcium bicarbonate, thus avoiding an increase in calcium content in the final product.

Reference has been made to the introduction of sludge solids into the carbonating operation by way of line 22. This material is a part of the sludge from the separating operation 26. The amount of sludge introduced into the carbonating operation may vary in practice, but in general it is desirable to increase the solids present during carbonation from 2 to 4% to provide for example from 10 to 12% solids content for the material being carbonated. It has been found that such an increase in solids during carbonation tends to minimize scale formation on the equipment used, and in addition it makes for more efficient recovery of magnesium content from the dolomite. In other words it serves to reduce the amount of magnesium content passing out of the system with the sludge.

The amount of material supplied to the operation 24 to precipitate the calcium bicarbonate is relatively small. For example assuming that the material is sodium hydroxide, solution can be prepared consisting of 25% sodium hydroxide in water, and one part of such solution can be supplied to 500 parts of 3% magnesium bicarbonate in solution being received from the carbonating operation. Assuming that magnesium hydroxide is supplied one can use a slurry containing about 8% magnesium hydroxide in water, and one part of such suspension or slurry can be supplied for 100 parts of a 3% magnesium bicarbonate solution. Assuming that calcined dolomite is used containing 21% magnesium oxide and 32% calcium content (on a calcium oxide basis) and that the dolomitic slurry provided by way of line 25 contains 20% solids, then one part of such slurry can be used with approximately 100 parts of 3% magnesium bicarbonate solution.

My process is capable of producing magnesium compounds of high purity, such as a magnesium oxide analyzing as follows:

| | Per cent |
|---|---|
| MgO | 99.85 |
| CaO | 0.05 |
| $Al_2O_3$ | 0.03 |
| $Fe_2O_3$ | 0.03 |
| $SiO_2$ | 0.02 |
| $SO_4$ | Trace |
| NaCl | 0.02 |

Overall yields can be obtained of the order of 85 to 95% or even better.

While the process has been described above as applicable to treatment of dolomite or dolomitic materials, the process is applicable to other materials such as magnesite, brucite, serpentine or olivine. In the use of such raw materials they are first crushed, calcined, ground and then mixed with water to form a slurry for the carbonating step. Here again it is possible to supply a small amount of the calcined material to the operation 24 for precipitating calcium bicarbonate which may be formed because of the presence of varying amounts of calcium originating with the source material.

It is also possible for the present invention to be incorporated in a process such as disclosed in copending application Serial Number 486,391, now Patent No. 2,458,847, filed May 10, 1943, and entitled "Process for the Manufacture of Magnesium Products." Thus as shown in Figure 2 a suitable brine containing convertible magnesium salts, such as sea water, is supplied to a precipitating operation 40. Pretreatment such as ordinarily practiced in processes for the manufacture of magnesium hydroxide from sea water (see, for example, Chesny 2,089,339) can be omitted in entirety or applied only to the extent of chlorination and settling out of readily removable solids. In the precipitating operation the brine is reacted with a precipitant such as lime or dolomite, which is prepared by calcining 41, followed by crushing 42. While it is possible to make up a slurry of this calcined material which in turn is contacted with a brine, I prefer to take the dry powdered calcined material and intermix it directly with the sea water, after which the reaction is permitted to proceed to completion and the precipitated magnesium hydroxide is permitted to settle to the lower portion of the tank. As illustrated the calcined lime or dolomite is shown being fed at a controlled rate to the mixing vessel 40a, where it is intermixed with the incoming brine solution. The mixture is then passed to the tank 40b, where the reaction is completed and the precipitate permitted to settle out from the effluent or mother liquor.

The slurry withdrawn from the precipitating tank is then passed to a thickening operation 43 to produce a thickened magnesium hydroxide slurry for further treatment. In a typical instance the slurry withdrawn from the precipitating tank 40b can contain from 1.1 to 1.3% solids, and the thickened slurry can contain from 15 to 25% solids.

The thickened slurry from 43 contains a certain amount of calcium, a part of which is in dissolved form, namely as calcium chloride and calcium sulphate, which are formed by the reaction of lime with the magnesium chloride and magnesium sulphate of the sea water. Another part of the calcium present is in solid phase, as for example reacted calcium oxide or hydroxide remaining from the precipitant, and calcium carbonate formed by virtue of precipitation of calcium bicarbonate contained in the original sea water. The dissolved calcium chloride and calcium sulphate are eliminated or precipitated prior to contacting the slurry with a major part of the magnesium bicarbonate solution returned back from a later stage by way of line 44. As disclosed in said application Ser. No. 486,391 this is accomplished by a precarbonation step 45 carried out while the slurry is at an elevated temperature of from 70 to 90° C. Hot flue gas can be passed through the slurry as indicated whereby the slurry is heated and the dissolved calcium sulphate and calcium chloride converted to solid phase calcium carbonate. The reaction involved in carbonating calcium chloride and calcium sulphate results in conversion of a minor percentage of magnesium hydroxide to magnesium chloride and magnesium sulphate.

Instead of utilizing flue gas for precarbonation a small proportion of the bicarbonate solution from line 44 can be diverted and mixed with the slurry while the slurry is heated to from 70 to 90° C. The reaction in this instance is substantially the same in that available calcium present, in the form of calcium sulphate or calcium chloride, is converted to calcium carbonate and some magnesium chloride and magnesium sulphate are formed.

Following precarbonation at 45 the slurry is shown being diluted at 46 with effluent 44, which as will be presently explained contains dissolved impurities together with some unconverted magnesium bicarbonate. After such dilution the slurry containing from say 1 to 1.7% magnesium hydroxide, is treated in the main carbonating operation 47.

The carbonating operation 47 can be carried out in the same general manner previously described with reference to Figure 1. Upon completing carbonation the carbonated material contains small amounts of calcium bicarbonate in dissolved form, and which tends to subsequently precipitate as calcium carbonate to contaminate the final magnesium oxide. This dissolved calcium is precipitated in the same manner as described with reference to Figure 1, namely by providing a hydroxyl ion sufficient to combine with the calcium bicarbonate to precipitate the same as calcium carbonate. Treatment tank 48 is indicated for this operation, and this tank receives a suitable amount of material from the thickening operation 43, together with the material from the carbonating operation, and a small amount of a suitable coagulant as previously described. Thus magnesium hydroxide introduced into the bicarbonate solution reacts with the calcium bicarbonate to precipitate the same as solid phase calcium carbonate.

The material from operation 48 passes to the hydraulic separating operation 49, where the solid phase material is removed as indicated in the form of a sludge. Line 51 represents reintroduction of a portion of this sludge back into the carbonating operation, as described for Figure 1. The bicarbonate solution from the separating operation 49 passes to the aerating operation 52 which is carried out as previously described, for the conversion of magnesium bicarbonate to solid phase neutral magnesium carbonate. Material from this aerating operation passes to a thickening operation 53, and then to a dewatering operation 54 carried out by centrifuging, filtering, etc. The final solid phase material can be subjected to calcining 55 or other processing, to produce magnesium oxide or other magnesium compounds. Effluent from operations 53 and 54 is shown being returned by way of line 44 to the treatment operation 46. Line 57 represents diversion of a part of this effluent from the system, in order to prevent a build up of dissolved impurities such as sodium chloride.

The process of Figure 2 makes use of my invention in the same manner as Figure 1. Magnesium bicarbonate concentrations of the order previously mentioned are provided by the carbonating operation, beneficial results are secured by the return of sludge solids to the carbonating operation, and although there is a considerable increase in the calcium bicarbonate content after carbonation due to agitation, I prevent this from increasing the calcium content of the final product by precipitation of all such calcium bicarbonate in the operation 48.

I claim:

1. In a process for the manufacture of magnesium compounds wherein there is formed an aqueous slurry containing solid phase magnesium hydroxide together with a calcium compound capable of forming calcium bicarbonate upon contact with carbon dioxide, the steps of contacting the slurry in a carbonating operation with carbon dioxide containing gas to convert the magnesium content to magnesium bicarbonate in solution, subjecting the carbonated material to separation to remove the solid phase impurities from the magnesium bicarbonate solution, and returning a part of the separated solids back to the carbonating operation to thereby increase the percentage of solids during carbonation.

2. In a process for the manufacture of magnesium compounds wherein there is formed an aqueous slurry containing solid phase magnesium hydroxide together with a calcium compound capable of forming calcium bicarbonate upon contact with magnesium bicarbonate solution, the steps of contacting the slurry in a carbonating operation with a solution of magnesium bicarbonate and a carbon dioxide containing gas to convert the magnesium content to magnesium bicarbonate in solution, subjecting the carbonated material to separation to remove the solid phase impurities from the magnesium bicarbonate solution, and returning a part of the separated solid phase impurities to the carbonating operation to thereby increase the percentage of solids during carbonation.

3. In a process for the manufacture of magnesium compounds wherein there is formed an aqueous slurry containing solid phase magnesium hydroxide together with a calcium compound capable of forming calcium bicarbonate upon contact with carbon dioxide, the steps of contacting the slurry in a carbonating operation with carbon dioxide containing gas to convert the magnesium content to magnesium bicarbonate in solution, subjecting the carbonated material to separation to remove the solid phase impurities from the magnesium bicarbonate solution, and returning a part of the separated solids to the carbonating operation to increase the percentage of solids during carbonation to provide nuclei for calcium compound precipitation, and to minimize scale formation.

4. In a process for the manufacture of magnesium compounds wherein there is formed an aqueous slurry containing solid phase magnesium hydroxide together with a calcium compound capable of forming calcium bicarbonate upon contact with carbon dioxide, the steps of contacting the slurry in a carbonating operation with carbon dioxide containing gas to convert the magnesium content to magnesium bicarbonate in solution, subjecting the carbonated material to separation to remove the solid phase impurities from the magnesium bicarbonate solution, and returning a part of the separated solids to the carbonating operation to increase the percentage of solids during carbonation to promote precipitation of calcium carbonate and to minimize scale formation.

GUNTER H. GLOSS.

REFERENCES CITED

The following references are of record in the file of this patent:

UNITED STATES PATENTS

| Number | Name | Date |
|---|---|---|
| 1,101,772 | Young | June 30, 1914 |
| 1,540,391 | Gelleri et al. | June 2, 1925 |
| 2,209,444 | Beeze | July 30, 1940 |
| 2,276,245 | Clarke | Mar. 10, 1942 |
| 2,357,130 | Pike | Aug. 29, 1944 |
| 2,390,095 | Gloss | Dec. 4, 1945 |

FOREIGN PATENTS

| Number | Country | Date |
|---|---|---|
| 548,197 | Great Britain | Sept. 30, 1942 |